United States Patent [19]

Guitton et al.

[11] 4,105,835

[45] Aug. 8, 1978

[54] SOLID-DEPOLARIZER ELECTRIC CELLS

[75] Inventors: Jacques Guitton, St-Ismier; Christian Jacques Maurice Charles Alexis Payn, Barbazan, both of France

[73] Assignee: ETAT FRANCAIS rep by Del. Min pour l'Armement, France

[21] Appl. No.: 745,607

[22] Filed: Nov. 29, 1976

Related U.S. Application Data

[63] Continuation of Ser. No. 622,872, Oct. 16, 1975, abandoned.

[30] Foreign Application Priority Data

Oct. 31, 1974 [FR] France ............................... 74 36359

[51] Int. Cl.² ............................................. H01M 6/04
[52] U.S. Cl. .................................... 429/133; 429/199
[58] Field of Search ............... 429/199, 201, 224, 229, 429/166, 133

[56] References Cited

U.S. PATENT DOCUMENTS

| 2,403,571 | 7/1946 | Wilke | 429/201 |
| 2,766,315 | 10/1956 | Jobe et al. | 429/199 |
| 3,902,921 | 9/1975 | Augustynski et al. | 429/199 |
| 3,928,076 | 12/1975 | Moser et al. | 429/199 |

FOREIGN PATENT DOCUMENTS 2,116,710 6/1972 France.
2,164,046 7/1973 France.
2,172,884 10/1973 France.

Primary Examiner—Donald L. Walton
Attorney, Agent, or Firm—Stevens, Davis, Miller & Mosher

[57] ABSTRACT

An electric cell, for example of the Leclanché and mercury cell types, having a solid depolarizer, a zinc anode, and an electrolyte which comprises an aqueous solution of lithium chloride and zinc perchlorate or magnesium perchlorate.

5 Claims, 6 Drawing Figures

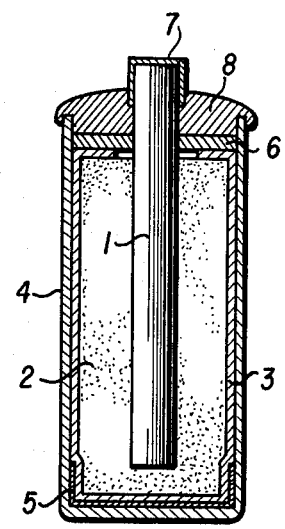
FIG. 1
FIG. 2
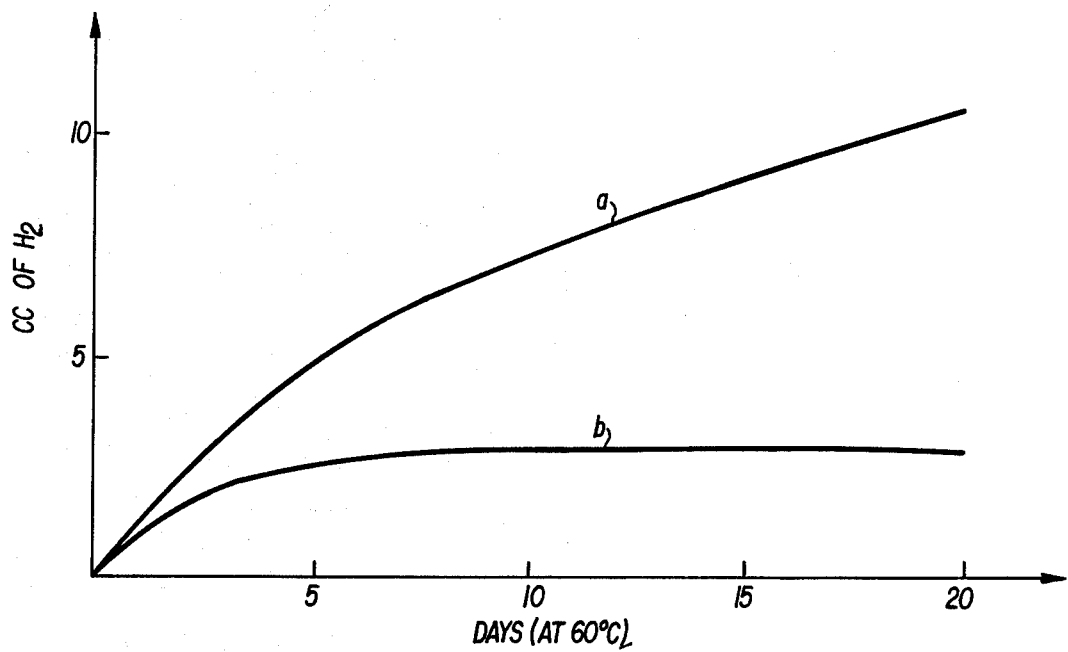

SOLID-DEPOLARIZER ELECTRIC CELLS

This is a continuation of application Ser. No. 622,872 filed Oct. 16, 1975, now abandoned.

The present invention relates to an improvement in solid-depolarizer electric cells of the Leclanche and mercury cell types or others.

It is known that the conventional Leclanché cell comprises a zinc anode, an electrolyte based on zinc chloride and ammonium chloride, and a manganese dioxide cathode. At the present time, this cell is very generally constituted by a can of amalgamated zinc in which is inserted a "pack" or "bundle" composed of a graphite rod surrounded by an annular mass of manganese dioxide loaded with carbon powder and around which there is wrapped a suitable separator fabric or paper impregnated with gelled electrolyte, the can being closed by a plug of pitch, wax or the like. It is to be noted, however, that the graphite rod which projects above the plug is designed to be porous to ensure the removal of the small quantity of gas which the cell unavoidably gives off in the course of its useful life.

It has been known for a long time that it is the zinc chloride ($ZnCl_2$) which constitutes the most active agent in the electrolyte. Tests have even shown that better operating characteristics are obtained by completely eliminating ammonium chloride ($NH_4Cl$). Unfortunately, the ammonium chloride is indispensable for the preservation of the cell due to the fact that it forms on the zinc an insoluble protective deposit of zinc diamine chloride ($Zn(NH_3)_2Cl_2$), which slows down corrosion of the metal at ordinary or slightly elevated temperatures. In the absence thereof, the cell does not last long. In the end, therefore, the composition of the electrolyte in practice is the result of a compromise between the concentrations of $NH_4Cl$ and $ZnCl_2$.

In spite of numerous improvements of detail, commercial Leclanché cells show three important faults.

The first is their poor efficiency at the high discharge rates which there is a tendency to impose on them in many applications, such as miniature in transistorized radio sets, portable machines or appliances with an electric motor, in particular record players, tape recorders, shavers, toys, etc.

The second fault of the cells of the kind in question is their loss of capacity during storage. Sale in large stores or supermarkets or by mail requires that the manufacturer incorporate the cells in equipment before it is packed or stored. By reason of the loss of capacity, the cells must be changed from time to time (practically speaking every 6 months) in unsold goods if one wishes to avoid customer complaints of abnormally low capacity. An improvement in the useful keeping life of cells of the Leclanché type therefore constitutes an important step forward.

The third fault is the one for which the present invention has provided a remedy: the cells, which are generally used at ordinary temperatures, may frequently be subjected to rather low temperatures, whether this be in Scandinavian or continental countries or in winter or in mountains. Under these conditions, it is not rare for the temperature to drop to −20° C.

However, in all these cases, one thing is certain: these cells must be able to function and to be stored at ordinary temperatures up to higher temperatures which may reach 40° C to 50° C in summer. In brief, almost universal use is demanded of these standard cells.

It is the Leclanché type cell, the manufacture of which is simple, which keeps relatively well and the prime cost of which is moderate, of which this universal use is generally demanded. However, it is well known that the operation thereof decreases in efficiency at low temperature. It polarizes rapidly. The efficiency scarcely exceeds, in the best of cases and for the best utilization, 25% of what it is at ordinary temperature. Generally, this figure is on the whole around 10%.

Another fault which can be found with present Leclanché cells resides in their imperfect tightness. As indicated hereinbefore, provision must be made for the removal of small quantities of gas resultant in particular from the decomposition of the organic constituents of the gel with which the separator fabric or paper is impregnated, and also from the attack of the zinc in open circuit, which removal is achieved by using a porous central rod. It frequently happens, however, that these gases entrain with them some electrolyte, which gives rise to the formation of creeping salts, and may cause incipient attack of the surfaces adjacent the cell in question, etc. Moreover, the water of the electrolyte may evaporate in a more or less appreciable manner in time.

Various researches and studies have been made for some years to try to improve this type of cell.

French Patents Nos. 2,164,046 and 2,172,884, for example describe long-keeping cells having a solid depolarizer and a zinc anode having considerably improved discharge characteristics and which can be closed in a perfectly tight manner so as to avoid any evaporation of electrolyte and any external deposit of salts. These cells have as electrolytes either aqueous solutions of zinc perchlorate ($Zn(ClO_4)_2$), preferably charged with zinc hydroxide ($Zn(OH)_2$), or aqueous solutions of magnesium perchlorate ($Mg(ClO_4)_2$).

The use of such electrolytes dispenses with the necessity of having to incorporate any gell in the separator fabric or paper of the cells and enables use to be made of unamalgamated zinc without involving risks of corrosion as great as the risks with the known cells. The use of these electrolytes also has the advantage of avoiding the liberation of gas, the cells obtained being thus capable of being closed in a perfectly tight manner.

If these various improvements have enabled some of the disadvantages hereinbefore mentioned to be remedied, nevertheless that cells as obtained at the present time are still very sensitive to variations in temperature and have in particular rather poor operation on account of certain polarization phenomena.

The present invention remedies these shortcomings by proposing long-keeping cells of the Leclanche type having considerably improved discharge characteristics, both at ordinary temperature and down to −20° C.

The invention also relates to the production of solid-depolarizer cells of the Leclanché type which can be sealed in a perfectly tight manner so as to avoid any evaporation of electrolyte and any external deposit of salts.

According to the invention, in a solid-depolarizer cell having a zinc anode there is used as electrolyte an aqueous solution of zinc perchlorate ($Zn(ClO_4)_2$) or magnesium perchlorate ($Mg(ClO_4)_2$) and lithium chloride (LiCl).

According to one characteristic of the invention, the concentration of $Zn(ClO_4)_2$ or $Mg(ClO_2)_2$ in the $Zn(ClO_4)_4$ - LiCl or $Mg(ClO_4)_2$ - LiCl mixture is chosen between about 0.75 and 1.25 mols/liter and that of LiCl between about 1.5 and 2.5 mols/liter.

According to another characteristic of the invention, the incorporation of any gel in the separator fabric or paper is advantageously dispensed with, the separator fabric or paper being impregnated only with the electrolyte. It is possible to use a can of unamalgamated zinc without involving risks of corrosion as great as those encountered in known cells.

According to another characteristic of the invention, by reason of the absence of any liberation of gas, the cell is preferably sealed in a perfectly tight manner, its graphite rod not being designed to be porous or being covered with a tight coating in the portion thereof located above the pitch plug.

According to another characteristic of the invention, the electrolyte containing zinc perchlorate and lithium chloride is preferably charged with zinc hydroxide.

The other characteristics and advantages of the invention will become better apparent by reading the following description of a particular embodiment and of the various tests to which the new cells according to the invention have been subjected with reference to the accompanying drawing and graphs.

FIG. 1 is a vertical section of a manganese dioxide cell according to the invention.

FIGS. 2-6 are curves comparing the various characteristics of the cell of the present invention to that of a conventional cell.

Figure 3:
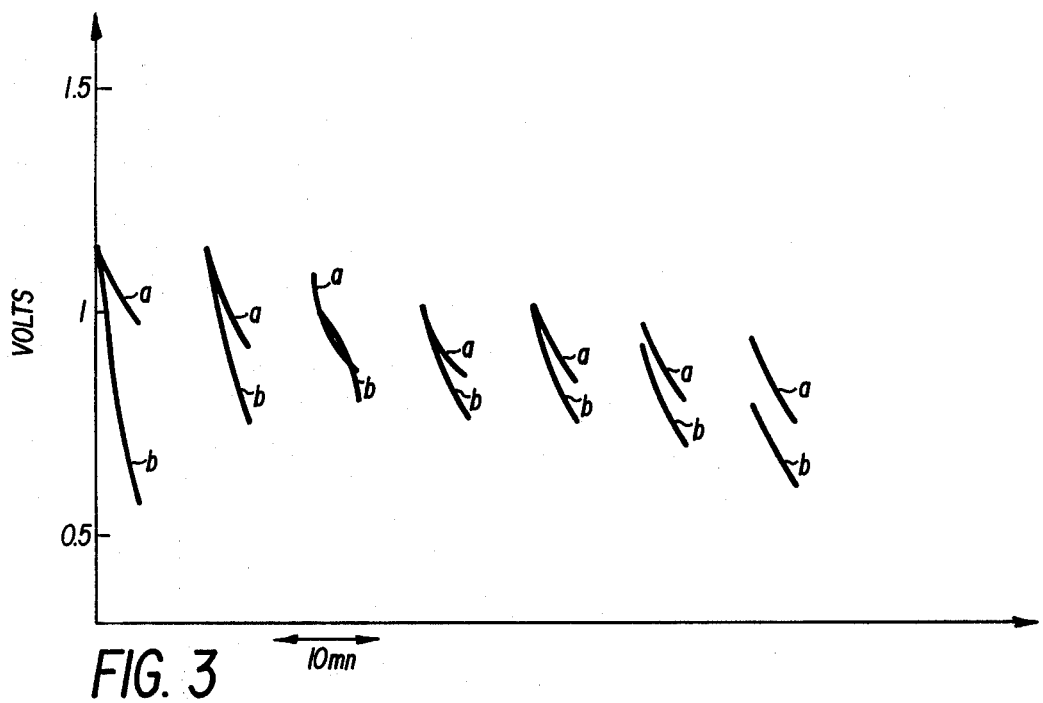

Like the present commercial Leclanché cell, the cell comprises a cathode 1 constituted by a graphite rod which is surrounded by a manganese dioxide mass 2 impregnated with electrolyte and separated by a paper cylinder 3, likewise impregnated with the electrolyte, from a zinc can 4. A cardboard disc 5 is interposed between the lower end of the assembly or "pack" 1-2-3 and the bottom of the zinc can 4. The pack 1-2-3 is surmounted by a washer 6 through which the rod 1 extends, the projecting end of the rod being provided with a metal cap 7 designed to form a current supply connection. On top of the washer 6 there is cast a plug 8 of pitch, wax or the like.

The cell according to the invention is distinguished from the conventional Leclanché cell by the following characteristics.

First of all, the electrolyte is no longer the usual $ZnCl_2$ + $NH_4Cl$ mixture, but of course only $Zn(ClO_4)_2$. LiCl, that is to say an aqueous solution of zinc perchlorate and lithium chloride. The preferred concentration is of the order of 1 mol/liter of $Zn(ClO_4)_2$ and 1.5 mols/liter of LiCl.

The mass 2 contains, in known manner, carbon in a finely divided state, for example soot, acetylene black, etc. Moreover, zinc hydroxide ($Zn(OH)_2$) may be added thereto.

So as to appreciate the preparation of the agglomerated mass 2 better, the following example may be given: 10% soot and 4% zinc hydroxide ($ZN(OH)_2$) are added to a mass of electrolytic manganese dioxide. To 116 g of the mixture so obtained there are added 50 cc of an aqueous solution containing zinc perchlorate in a concentration of 1 mol/liter, and LiCl in a concentration of 1.5 mols/liter. To make the pack of a cell of size R6, 8 g of the paste so obtained are taken and the paste is compressed into a cylindrical wrapper corresponding to the dimensions of the standardized R6 zinc can, thereby surrounding it with a paper separator not coated with gell of any kind. The compressed body produced is then introduced into such a can and a graphite rod such as the rod 1 of FIG. 1 is then forcibly pushed axially into the cylindrical mass of paste.

A third difference between the known Leclanché cell and that of FIG. 1 is that the paper separator 3 is no longer impregnated with a gel of the electrolyte, but of course with this electrolyte in the state of an aqueous solution, without adding an organic gelling substance.

As regards the can 4, the use of amalgamated zinc is no longer indispensable, although it may be contemplated with interest.

As shown in FIG. 1, the cell is tightly sealed. To do this, the base of the metal cap 7 is embedded in the plug 8, but it will be understood that the same result could be achieved by using a non-porous rod 1.

Of course, the zinc perchlorate ($Zn(ClO_4)_2$) in the preceding description may be replaced by magnesium perchlorate ($Mg(ClO_4)_2$) in the same concentration. However, cells with $Mg(ClO_4)_2$ do not contain hydroxide. The storage life qualities of the $Mg(ClO_4)_2$ cells are superior to those of the $Zn(ClO_4)_2$ cells, but the performances under cold conditions are slightly inferior.

FIG. 2 shows the liberation of hydrogen as a function of time for two identical zinc cans immersed in solutions of (a) zinc chloride ($ZnCl_2$) in a concentration of 1.5 mols/liter and (b) zinc perchlorate ($Zn(ClO_4)_2$) in a concentration of 1 mol/liter and lithium chloride (LiCl) in a concentration of 1.5 mols/liter, respectively. These can correspond to the standardized R6 size. It can be clearly seen that in the first case there is considerable liberation of hydrogen, which decreases slowly with time, without ever being nullified. In the second case, on the other hand, the liberation of hydrogen remains very slight and becomes stationary after 2 days.

FIG. 3 shows the curves resulting from intermittent discharges (4 times 10 minutes per 24 hours on 5 ohms at −20° C) of the cells according to the invention (a) and of a conventional Leclanché cell (b). The conventional stop norm is 0.7 V. It can be seen that on the first discharge the Leclanché cell is out of service after 6 minutes. The EMF of the cell according to the present invention has not yet dropped to this value after eight discharges.

Figure 4:
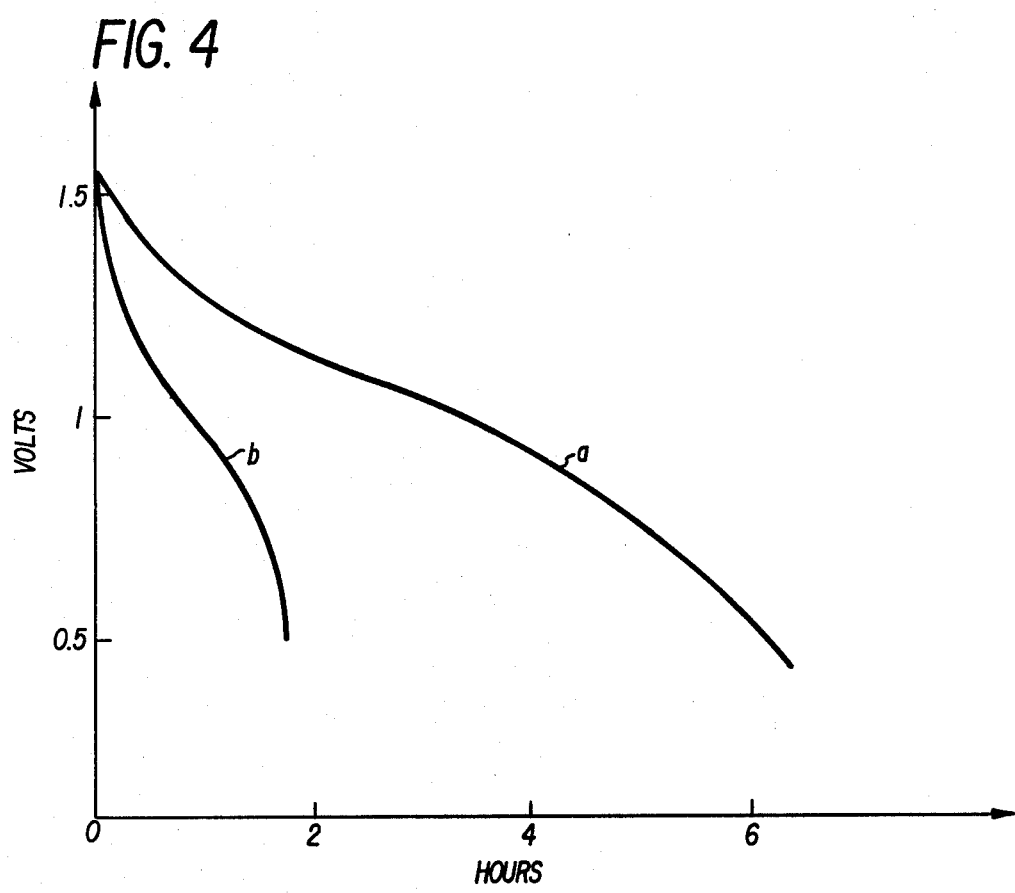

FIG. 4 shows the curves of continuous discharges on 20 ohms at −20° C. The EMF of the cell according to the present invention (a) reaches 0.7 V after 5 hours 15 minutes. That of a conventional Leclanché cell (b) reaches this same value after 1 hour 35 minutes.

Figure 5:
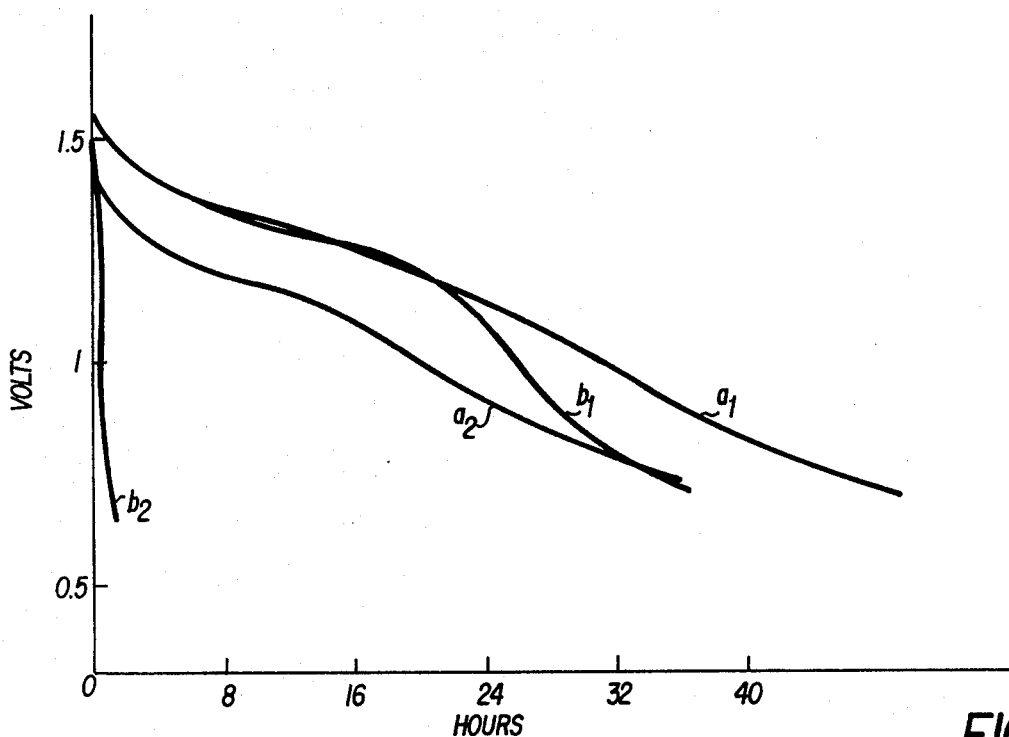

FIG. 5 shows the curves of continuous discharges on 60 ohms at 25° C just after manufacture ($a_1$), and after keeping for 3 months at 60° C ($a_2$), of the cell according to the present invention and of a conventional Leclanché cell (curves $b_1$ and $b_2$).

Figure 6:
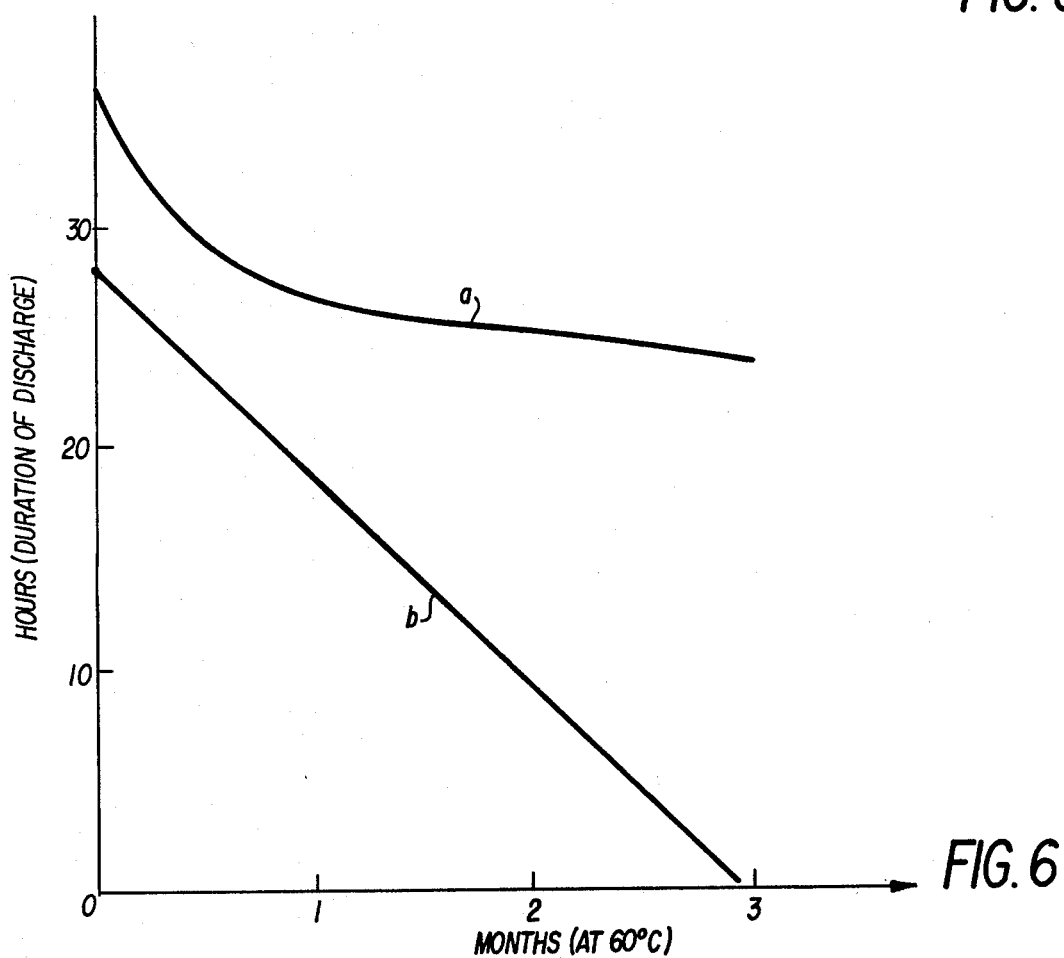

FIG. 6 shows the durations of continuous discharges on 60 ohms as a function of the duration of keeping at 60° C (stop at 0.9 V) of the cell of the present invention (a) and of the conventional Leclanché cell (b).

It can be seen in this Figure that the Leclanché cell loses its entire capacity after 3 months at 60° C, whereas the capacity of the cell of the present invention is stabilized from the end of the first month.

Of course, various modifications may be made in the invention without thereby limiting the scope thereof.

What is claimed is:

1. An electric cell useful in a temperature range of −20° C to +60° C which is perfectly tightly sealed and has a long storage life after which the cell is still operable, comprising: a zinc anode; a solid cathodic depolarizer; a separator between the anode and cathodic depolarizer; and an electrolyte consisting of an aqueous solution of LiCl in a concentration between about 1.5 to 2.5 moles per liter and another material consisting of Mg(ClO$_4$)$_2$ without Mg(OH)$_2$ present in a concentration between 0.75 and 1.25 moles per liter; wherein said electrolyte does not involve risks of corrosion of the zinc anode as great as the risks in known cells.

2. The electric cell of claim 1 wherein the zinc anode is in the form of a cylindrical can, said can being separated from said solid cathodic depolarizer by a paper separator, the depolarizer being a mass of manganese dioxide and finely divided carbon impregnated with said electrolyte within said can, the current collector being substantially imbedded in said mass and a current supply connector in contact with said collector and protruding from the cell, said mass, electrolyte and collector being perfectly tightly sealed within said cell.

3. The electric cell of claim 2, wherein said paper separator is impregnated only with said electrolyte.

4. The electric cell of claim 2, wherein said collector is a carbon rod.

5. The electric cell of claim 4, wherein said connector is a metallic cap on an end of the carbon rod.

* * * * *